United States Patent
Struhsaker

(10) Patent No.: US 9,379,916 B2
(45) Date of Patent: *Jun. 28, 2016

(54) WIRELESS COMMUNICATION SYSTEM AND DEVICE FOR COUPLING A BASE STATION AND MOBILE STATIONS

(71) Applicant: Access Solutions, Ltd., Dallas, TX (US)

(72) Inventor: Paul F. Struhsaker, Plano, TX (US)

(73) Assignee: Access Solutions, Ltd., Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/595,208

(22) Filed: Jan. 12, 2015

(65) Prior Publication Data

US 2015/0126243 A1 May 7, 2015

Related U.S. Application Data

(63) Continuation of application No. 13/567,978, filed on Aug. 6, 2012, which is a continuation of application No. 11/982,458, filed on Oct. 31, 2007, which is a
(Continued)

(51) Int. Cl.
*H04W 36/00* (2009.01)
*H04L 12/66* (2006.01)
(Continued)

(52) U.S. Cl.
CPC ........... *H04L 12/66* (2013.01); *H04M 1/72502* (2013.01); *H04W 16/14* (2013.01);
(Continued)

(58) Field of Classification Search
USPC ................ 455/422.1, 426.1, 426.2, 443, 444, 455/552.1–554.2
See application file for complete search history.

(56) References Cited

U.S. PATENT DOCUMENTS 4,797,898 A * 1/1989 Martinez ................ H04B 3/141
  375/219
5,115,463 A   5/1992 Moldavsky et al.
(Continued)

FOREIGN PATENT DOCUMENTS

EP   0304955   3/1989
EP   0690637   3/1996
(Continued)

OTHER PUBLICATIONS

European Telecommunications Standards Institute, "Broadband Radio Access Networks, Inventory of Broadband Radio Technologies and Techniques", ETSI TR 101 173 V1.1, May 1998, chapter 7, pp. 29-38.
(Continued)

*Primary Examiner* — Dominic Rego
(74) *Attorney, Agent, or Firm* — Byrne Poh LLP

(57) ABSTRACT

Wireless communication devices, comprising: a first transceiver in wireless communication with a terrestrial base station, wherein the station is in wireless communication with wireless communication devices; and a second wireless LAN transceiver in wireless communication with computing devices located within a coverage area of the second transceiver, the second transceiver being coupled to the first transceiver wherein: the first transceiver receives a first signal from the station, the first signal intended for a first computing device of the computing devices, the second wireless LAN transceiver determines signal characteristics of the first computing device, and the second transceiver transmits the first signal to the first computing device based on the determined signal characteristics of the first computing device; and the second transceiver receives a second signal from the first computing device, the second signal intended for the station, and the first transceiver transmits the second signal to the station.

16 Claims, 7 Drawing Sheets

Related U.S. Application Data continuation of application No. 09/839,499, filed on Apr. 20, 2001, now Pat. No. 7,346,347.

(60) Provisional application No. 60/262,708, filed on Jan. 19, 2001, provisional application No. 60/262,712, filed on Jan. 19, 2001, provisional application No. 60/262,825, filed on Jan. 19, 2001, provisional application No. 60/262,698, filed on Jan. 19, 2001, provisional application No. 60/262,827, filed on Jan. 19, 2001, provisional application No. 60/262,826, filed on Jan. 19, 2001, provisional application No. 60/262,951, filed on Jan. 19, 2001, provisional application No. 60/262,824, filed on Jan. 19, 2001, provisional application No. 60/263,101, filed on Jan. 19, 2001, provisional application No. 60/263,097, filed on Jan. 19, 2001, provisional application No. 60/273,579, filed on Mar. 5, 2001, provisional application No. 60/262,955, filed on Jan. 19, 2001, provisional application No. 60/273,689, filed on Mar. 5, 2001, provisional application No. 60/273,757, filed on Mar. 5, 2001, provisional application No. 60/270,378, filed on Feb. 21, 2001, provisional application No. 60/270,385, filed on Feb. 21, 2001, provisional application No. 60/270,430, filed on Feb. 21, 2001.

(51) Int. Cl.

| | |
|---|---|
| *H04W 84/14* | (2009.01) |
| *H04W 84/04* | (2009.01) |
| *H04W 84/12* | (2009.01) |
| *H04W 16/14* | (2009.01) |
| *H04M 1/725* | (2006.01) |
| *H04W 88/06* | (2009.01) |
| *H04W 24/02* | (2009.01) |

(52) U.S. Cl.
CPC ........... *H04W 24/02* (2013.01); *H04W 84/045* (2013.01); *H04W 84/12* (2013.01); *H04W 84/14* (2013.01); *H04W 88/06* (2013.01)

(56) References Cited

U.S. PATENT DOCUMENTS

| | | | |
|---|---|---|---|
| 5,416,831 A | 5/1995 | Chewning et al. | |
| 5,475,735 A | 12/1995 | Williams et al. | |
| 5,490,252 A | 2/1996 | Macera et al. | |
| 5,603,095 A | 2/1997 | Uola | |
| 5,604,789 A | 2/1997 | Lerman | |
| 5,638,371 A | 6/1997 | Raychaudhuri et al. | |
| 5,659,605 A | 8/1997 | Voit et al. | |
| 5,673,307 A | 9/1997 | Holland et al. | |
| 5,684,791 A | 11/1997 | Raychaudhuri et al. | |
| 5,694,424 A | 12/1997 | Ariyavisitakul | |
| 5,745,837 A | 4/1998 | Fuhrmann | |
| 5,745,841 A | 4/1998 | Reudink et al. | |
| 5,790,936 A | 8/1998 | Dinkins | |
| 5,809,086 A | 9/1998 | Ariyavisitakul | |
| 5,884,148 A | 3/1999 | Bilgic et al. | |
| 5,901,352 A | 5/1999 | St-Pierre et al. | |
| 5,915,215 A | 6/1999 | Williams et al. | |
| 5,933,776 A | 8/1999 | Kirkpatrick | |
| 5,991,292 A | 11/1999 | Focsaneanu et al. | |
| 5,995,851 A | 11/1999 | Lim | |
| 6,014,546 A | 1/2000 | Georges et al. | |
| 6,016,311 A | 1/2000 | Gilbert et al. | |
| 6,023,459 A | 2/2000 | Clark et al. | |
| 6,023,462 A | 2/2000 | Nieczyporowicz et al. | |
| 6,035,178 A | 3/2000 | Chennakeshu et al. | |
| 6,052,408 A | 4/2000 | Struhsaker et al. | |
| 6,097,968 A | 8/2000 | Bannister et al. | |
| 6,115,367 A * | 9/2000 | Archambaud | H04B 7/0808 370/334 |
| 6,150,955 A | 11/2000 | Tracy et al. | |
| 6,163,698 A | 12/2000 | Leitch et al. | |
| 6,185,412 B1 | 2/2001 | Pentikainen et al. | |
| 6,188,873 B1 | 2/2001 | Wickman et al. | |
| 6,192,248 B1 | 2/2001 | Solondz | |
| 6,222,503 B1 | 4/2001 | Gietema et al. | |
| 6,226,274 B1 | 5/2001 | Reese et al. | |
| 6,289,213 B1 | 9/2001 | Flint et al. | |
| 6,324,384 B1 | 11/2001 | Nobuyasu et al. | |
| 6,363,252 B1 | 3/2002 | Hamalainen et al. | |
| 6,374,078 B1 | 4/2002 | Williams et al. | |
| 6,377,800 B1 | 4/2002 | Cho | |
| 6,378,119 B1 | 4/2002 | Raves | |
| 6,421,329 B1 | 7/2002 | Kikinis | |
| 6,526,290 B1 | 2/2003 | Yla-Mella et al. | |
| 6,560,213 B1 | 5/2003 | Izadpanah et al. | |
| 6,564,051 B2 | 5/2003 | Struhsaker et al. | |
| 6,587,444 B1 | 7/2003 | Lenzo et al. | |
| 6,600,914 B2 | 7/2003 | Uhlik et al. | |
| 6,654,605 B1 | 11/2003 | Seo | |
| 6,697,606 B1 | 2/2004 | Wagemans et al. | |
| 6,792,286 B1 | 9/2004 | Bharath et al. | |
| 6,804,527 B2 | 10/2004 | Struhsaker et al. | |
| 6,836,546 B1 | 12/2004 | Willer | |
| 6,839,333 B1 | 1/2005 | Akerberg | |
| 6,839,334 B1 | 1/2005 | Krishnamoorthy et al. | |
| 6,859,655 B2 | 2/2005 | Struhsaker | |
| 6,891,810 B2 | 5/2005 | Struhsaker et al. | |
| 6,925,072 B1 | 8/2005 | Grohn | |
| 6,925,516 B2 | 8/2005 | Struhsaker et al. | |
| 6,947,477 B2 | 9/2005 | Struhsaker et al. | |
| 6,954,432 B1 | 10/2005 | Bychowsky et al. | |
| 7,002,929 B2 | 2/2006 | Struhsaker et al. | |
| 7,010,023 B1 | 3/2006 | Sato | |
| 7,031,738 B2 | 4/2006 | Struhsaker | |
| 7,035,241 B2 | 4/2006 | Struhsaker | |
| 7,061,886 B1 | 6/2006 | Moon et al. | |
| 7,065,098 B2 | 6/2006 | Struhsaker et al. | |
| 7,069,047 B2 | 6/2006 | Struhsaker et al. | |
| 7,075,967 B2 | 7/2006 | Struhsaker et al. | |
| 7,099,339 B1 | 8/2006 | Wang et al. | |
| 7,099,383 B2 | 8/2006 | Struhsaker et al. | |
| 7,173,916 B2 | 2/2007 | Struhsaker et al. | |
| 7,218,890 B1 | 5/2007 | Iseli et al. | |
| 7,230,931 B2 | 6/2007 | Struhsaker | |
| 7,239,618 B1 | 7/2007 | La Porta et al. | |
| 7,274,946 B2 | 9/2007 | Struhsaker | |
| 7,292,844 B2 | 11/2007 | Dowling et al. | |
| 7,606,189 B1 | 10/2009 | Lee et al. | |
| 7,764,228 B2 | 7/2010 | Durst et al. | |
| 8,018,907 B2 * | 9/2011 | Kubler | G06F 1/1626 370/338 |
| 2001/0004595 A1 | 6/2001 | Dent | |
| 2001/0033561 A1 | 10/2001 | Rodin | |
| 2001/0041569 A1 | 11/2001 | Rahman | |
| 2001/0046859 A1 | 11/2001 | Kil | |
| 2002/0065063 A1 | 5/2002 | Uhlik et al. | |
| 2002/0097694 A1 | 7/2002 | Struhsaker | |
| 2002/0098799 A1 | 7/2002 | Struhsaker et al. | |
| 2002/0098858 A1 | 7/2002 | Struhsaker | |
| 2002/0141355 A1 | 10/2002 | Struhsaker et al. | |
| 2002/0152053 A1 | 10/2002 | Roy et al. | |
| 2002/0164991 A1 | 11/2002 | Arazi et al. | |
| 2002/0171581 A1 | 11/2002 | Sheynblat et al. | |
| 2004/0213188 A1 | 10/2004 | Struhsaker et al. | |
| 2005/0048985 A1 | 3/2005 | Haartsen | |
| 2005/0243745 A1 | 11/2005 | Stanwood et al. | |
| 2006/0233161 A1 | 10/2006 | Koenck et al. | |
| 2012/0147797 A1 | 6/2012 | Furuskar et al. | |

FOREIGN PATENT DOCUMENTS

| | | |
|---|---|---|
| EP | 0690638 | 3/1996 |
| WO | WO/97/41699 | 11/1997 |
| WO | WO/98/24254 | 6/1998 |
| WO | WO/99/09762 | 2/1999 |
| WO | WO/99/27720 | 6/1999 |

(56) References Cited

FOREIGN PATENT DOCUMENTS

| WO | WO/99/29126 | 6/1999 |
|---|---|---|
| WO | WO/99/37059 | 7/1999 |
| WO | WO/99/51043 | 10/1999 |
| WO | WO/01/56233 | 8/2001 |

OTHER PUBLICATIONS

Goodman, D.J. et al., "Packet Reservation Multiple Access for Local Wireless Communications", In IEEE Transactions on Communications, vol, 37, No. 8, Aug. 1989, pp, 885-890.
Kubbar, O. and Mouftah, H.T., "Multiple Access Control Protocols for Wireless ATM: Problems Definition and Design Objectives", In IEEE Comunication Magazine, vol. 35, No. 11, Nov. 1997, pp. 93-99.
Notice of Allowance dated Jun. 10, 2014 in U.S. Appl. No. 13/532,650.
Notice of Allowance dated Jun. 20, 2014 in U.S. Appl. No. 13/488,374.
Notice of Allowance dated Sep. 30, 2014 in U.S. Appl. No. 13/567,978.
Office Action dated Oct. 13, 2010 in U.S. Appl. No. 11/903,508.
Office Action dated Oct. 13, 2010 in U.S. Appl. No. 11/982,458.
Office Action dated Oct. 17, 2012 in U.S. Appl. No. 13/488,374.
Office Action dated Sep. 16, 2010 in U.S. Appl. No. 11/982,461.
Office Action dated Oct. 29, 2010 in U.S. Appl. No. 11/982,463.
Office Action dated May 23, 2011 in U.S. Appl. No. 11/982,404.
Office Action dated May 4, 2011 in U.S. Appl. No. 11/982,424.
Office Action dated May 7, 2004 in U.S. Appl. No. 09/839,499.
Office Action dated Jun. 14, 2013 in U.S. Appl. No. 13/532,650.
Offim Action dated Jun. 27, 2011 in U.S. Appl. No. 11/982,459.
Office Action dated Jul. 1, 2013 in U.S. Appl. No. 13/488,374.
Office Action dated Jul. 21, 2006 in U.S. Appl. No. 09/839,499.
Office Action dated Jul. 6, 2011 in U.S. Appl. No. 11/982,458.
Office Action dated Sep. 29, 2010 in U.S. Appl. No. 11/982,459.
Office Action dated Sep. 29, 2010 it U.S. Appl. No. 11/982,424.
Office Action dated Sep. 24, 2014 in U.S. Appl. No. 13/532,650.
Office Action dated Sep. 25, 2012 in U.S. Appl. No. 13/532,650.
Office Action dated Sep. 29, 2010 in U.S. Appl. No. 11/982,424.
Rappaport, T., "Wireless Communications, Principles and Practice". IEEE Press, 1996 (month unknown), chapter 8, pp. 395-436.
Roman. V.I., "Frequency Reuse and System Deployment in Local Multipoint Distibution Service," In IEEE Personal Communications, vol. 6, No. 6, Dec. 1999, pp. 20-27.
Sklar, B., "Digital Communications Fundamentals and Applications", Prentice Hall, 1988 (month unknown), chapter 9, pp. 520-597.
U.S. Appl. No. 11/903,508, filed Sep. 21, 2007.

\* cited by examiner

WIRELESS COMMUNICATION SYSTEM AND DEVICE FOR COUPLING A BASE STATION AND MOBILE STATIONS

CROSS-REFERENCE TO RELATED APPLICATIONS

This application is a continuation of U.S. patent application Ser. No. 13/567,978, filed Aug. 6, 2012, which is a continuation of U.S. patent application Ser. No. 11/982,458, filed Oct. 31, 2007, which is a continuation of U.S. patent application Ser. No. 09/839,499, filed Apr. 20, 2001, now U.S. Pat. No. 7,346,347, which claims the benefit of U.S. Provisional Patent Application No. 60/262,708, filed Jan. 19, 2001. Each of the above-identified applications is hereby incorporated by reference herein in its entirety.

The following applications are hereby incorporated by reference herein in their entireties:

1) U.S. Provisional Patent Application No. 60/262,712, filed Jan. 19, 2001 and entitled "WIRELESS COMMUNICATION SYSTEM USING BLOCK FILTERING AND FAST EQUALIZATION DEMODULATION AND METHOD OF OPERATION";
2) U.S. Provisional Patent Application No. 60/262,825, filed Jan. 19, 2001 and entitled "APPARATUS AND ASSOCIATED METHOD FOR OPERATING UPON DATA SIGNALS RECEIVED AT A RECEIVING STATION OF A FIXED WIRELESS ACCESS COMMUNICATION SYSTEM";
3) U.S. Provisional Patent Application No. 60/262,698, filed Jan. 19, 2001 and entitled "APPARATUS AND METHOD FOR OPERATING A SUBSCRIBER INTERFACE IN A FIXED WIRELESS SYSTEM";
4) U.S. Provisional Patent Application No. 60/262,827, filed Jan. 19, 2001 and entitled "APPARATUS AND METHOD FOR CREATING SIGNAL AND PROFILES AT A RECEIVING STATION";
5) U.S. Provisional Patent Application No. 60/262,826, filed Jan. 19, 2001 and entitled "SYSTEM AND METHOD FOR INTERFACE BETWEEN A SUBSCRIBER MODEM AND SUBSCRIBER PREMISES INTERFACE";
6) U.S. Provisional Patent Application No. 60/262,951, filed Jan. 19, 2001 entitled "BACKPLANE ARCHITECTURE FOR USE IN WIRELESS AND WIRELINE ACCESS SYSTEMS";
7) U.S. Provisional Patent Application No. 60/262,824, filed Jan. 19, 2001 entitled "SYSTEM AND METHOD FOR ON-LINE INSERTION OF LINE REPLACEABLE UNITS IN WIRELESS AND WIRELINE ACCESS SYSTEMS";
8) U.S. Provisional Patent Application No. 60/263,101, filed Jan. 19, 2001 entitled "SYSTEM FOR COORDINATION OF TDD TRANSMISSION BURSTS WITHIN AND BETWEEN CELLS IN A WIRELESS ACCESS SYSTEM AND METHOD OF OPERATION";
9) U.S. Provisional Patent Application No. 60/263,097, filed Jan. 19, 2001 and entitled "REDUNDANT TELECOMMUNICATION SYSTEM USING MEMORY EQUALIZATION APPARATUS AND METHOD OF OPERATION";
10) U.S. Provisional Patent Application No. 60/273,579, filed Mar. 5, 2001 and entitled "WIRELESS ACCESS SYSTEM FOR ALLOCATING AND SYNCHRONIZING UPLINK AND DOWNLINK OF TDD FRAMES AND METHOD OF OPERATION";
11) U.S. Provisional Patent Application No. 60/262,955, filed Jan. 19, 2001 and entitled "TDD FDD AIR INTERFACE";
12) U.S. Provisional Patent Application No. 60/262,708, filed Jan. 19, 2001 and entitled "APPARATUS, AND AN ASSOCIATED METHOD FOR PROVIDING WLAN SERVICE IN A FIXED WIRELESS ACCESS COMMUNICATION SYSTEM";
13) U.S. Provisional Patent Application No. 60/273,689, filed Mar. 5, 2001 and entitled "WIRELESS ACCESS SYSTEM USING STOP MULTIPLE MODULATION FORMATS IN TDD FRAMES AND METHOD OF OPERATION";
14) U.S. Provisional Patent Application No. 60/273,757, filed Mar. 5, 2001. and entitled "WIRELESS ACCESS SYSTEM AND ASSOCIATED METHOD USING MULTIPLE MODULATION FORMATS IN TDD FRAMES ACCORDING TO SUBSCRIBER SERVICE TYPE";
15) U.S. Provisional Patent Application No. 60/270,378, filed Feb. 21, 2001 and entitled "APPARATUS FOR ESTABLISHING A PRIORITY CALL IN A FIXED WIRELESS ACCESS COMMUNICATION SYSTEM";
16) U.S. Provisional Patent Application No. 60/270,385, filed Feb. 21, 2001 and entitled "APPARATUS FOR REALLOCATING COMMUNICATION RESOURCES TO ESTABLISH A PRIORITY CALL IN A FIXED WIRELESS ACCESS COMMUNICATION SYSTEM"; and
17) U.S. Provisional Patent Application No. 60/270,430 filed Feb. 21, 2001 and entitled "METHOD FOR ESTABLISHING A PRIORITY CALL IN A FIXED WIRELESS ACCESS COMMUNICATION SYSTEM.

In addition, the subject matter disclosed in the present application is related to that disclosed in the following U.S. patent applications, which are commonly assigned to the assignee of the present application, which may share common subject matter and figures, and which are each hereby incorporated by reference herein in their entireties:

1) U.S. patent application Ser. No. 10/042,705, filed Nov. 15, 2000, entitled "SUBSCRIBER INTEGRATED ACCESS DEVICE FOR USE IN WIRELESS AND WIRELINE ACCESS SYSTEMS";
2) U.S. patent application Ser. No. 09/838,810, filed Apr. 20, 2001 and entitled "WIRELESS COMMUNICATION SYSTEM USING BLOCK FILTERING AND FAST EQUALIZATION-DEMODULATION AND METHOD Of OPERATION", now U.S. Pat. No. 7,075,967;
3) U.S. patent application Ser. No. 09/839,726, filed Apr. 20, 2001 and entitled "APPARATUS AND ASSOCIATED METHOD FOR OPERATING UPON DATA SIGNALS RECEIVED AT A RECEIVING STATION OF A FIXED WIRELESS ACCESS COMMUNICATION SYSTEM", now U.S. Pat. No. 7,099,383;
4) U.S. patent application Ser. No. 09/839,729, filed Apr. 20, 2001 and entitled "APPARATUS AND METHOD FOR OPERATING A SUBSCRIBER INTERFACE IN A FIXED WIRELESS SYSTEM";
5) U.S. patent application Ser. No. 09/839,719, filed Apr. 20, 2001 and entitled "APPARATUS AND METHOD FOR CREATING SIGNAL AND PROFILES AT A RECEIVING STATION", now U.S. Pat. No. 6,947,477;
6) U.S. patent application Ser. No. 09/838,910, filed Apr. 20, 2001 and entitled "SYSTEM AND METHOD FOR INTERFACE BETWEEN A SUBSCRIBER MODEM AND SUBSCRIBER PREMISES INTERFACES", now U.S. Pat. No. 6,564,051;

7) U.S. patent application Ser. No. 09/839,509, filed Apr. 20, 2001 and entitled "BACKPLANE ARCHITECTURE FOR USE IN WIRELESS AND WIRELINE ACCESS SYSTEMS";

8) U.S. patent application Ser. No. 09/839,514, filed Apr. 20, 2001 and entitled "SYSTEM AND METHOD FOR ON-LINE INSERTION OF LINE REPLACEABLE UNITS IN WIRELESS AND WIRELINE ACCESS SYSTEMS", now U.S. Pat. No. 7,069,047;

9) U.S. patent application Ser. No. 09/839,512, filed Apr. 20, 2001 and entitled "SYSTEM FOR COORDINATION OF TDD TRANSMISSION BURSTS WITHIN AND BETWEEN CELLS IN A WIRELESS ACCESS SYSTEM AND METHOD OF OPERATION", now U.S. Pat. No. 6,804,527;

10) U.S. patent application Ser. No. 09/839,259, filed Apr. 20, 2001 and entitled "REDUNDANT TELECOMMUNICATION SYSTEM USING MEMORY EQUALIZATION APPARATUS AND METHOD OF OPERATION", now U.S. Pat. No. 7,065,098;

11) U.S. patent application Ser. No. 09/839,457, filed Apr. 20, 2001 and entitled "WIRELESS ACCESS SYSTEM FOR ALLOCATING AND SYNCHRONIZING UPLINK AND DOWNLINK OF TDD FRAMES AND METHOD OF OPERATION", now U.S. Pat. No. 7,002,929;

12) U.S. patent application Ser. No. 09/839,075, filed Apr. 20, 2001 and entitled "TDD FDD AIR INTERFACE", now U.S. Pat. No. 6,859,655;

13) U.S. patent application Ser. No. 09/839,458, filed Apr. 20, 2001 and entitled "WIRELESS ACCESS SYSTEM USING MULTIPLE MODULATION FORMATS IN TDD FRAMES AND METHOD OF OPERATION", now U.S. Pat. No. 7,173,916;

14) U.S. patent application Ser. No. 09/839,456, filed Apr. 20, 2001 and entitled "WIRELESS ACCESS SYSTEM AND ASSOCIATED METHOD USING MULTIPLE MODULATION FORMATS IN TDD FRAMES ACCORDING TO SUBSCRIBER SERVICE TYPE", now U.S. Pat. No. 6,391,810;

15) U.S. patent application Ser. No. 09/838,924, filed Apr. 20, 2001 and entitled "APPARATUS FOR ESTABLISHING A PRIORITY CALL IN A FIXED WIRELESS ACCESS COMMUNICATION SYSTEM", now U.S. Pat. No. 7,274,946;

16) U.S. patent application Ser. No. 09/839,727, filed Apr. 20, 2001 and entitled "APPARATUS FOR REALLOCATING COMMUNICATION RESOURCES TO ESTABLISH A PRIORITY CALL IN A FIXED WIRELESS ACCESS COMMUNICATION SYSTEM", now U.S. Pat. No. 7,031,738;

17) U.S. patent application Ser. No. 09/839,734, filed Apr. 20, 2001 and entitled "METHOD FOR ESTABLISHING A PRIORITY CALL IN A FIXED WIRELESS ACCESS COMMUNICATION SYSTEM", now U.S. Pat. No. 7,035,241;

18) U.S. patent application Ser. No. 09/839,513, filed Apr. 20, 2001 and entitled "SYSTEM AND METHOD FOR PROVIDING AN IMPROVED COMMON CONTROL BUS FOR USE IN ON-LINE INSERTION OF LINE REPLACEABLE UNITS IN WIRELESS AND WIRELINE ACCESS SYSTEMS", now U.S. Pat. No. 6,925,516; and 19) U.S. patent application Ser. No. 09/948,059, filed Sep. 1, 2001 and entitled "WIRELESS ACCESS SYSTEM USING SELECTIVELY ADAPTABLE BEAM FORMING IN TDD FRAMES AND METHOD OF OPERATION", now U.S. Pat. No. 7,230,931.

TECHNICAL FIELD

The present disclosure relates generally to wireless communication systems and more particularly, to a wireless communication system and associated method for routing messages.

BACKGROUND

Advancements in communication technologies have permitted the development, and implementation, of new types of communication systems. Such communication systems are able to permit the communication of increased amounts of data at increased throughput rates relative to conventional communication systems. And, such new communication systems have permitted communication of information at, and between, communication stations positioned at locations from which communications have conventionally been inconvenient or impractical.

Radio communication systems, for instance, are exemplarily of communication systems of which new types, and improvements to existing types, have been made possible as a result of advancements in communication technologies. Similar to other types of communication systems, in a radio communication system, information is communicated between a sending station and a receiving station by way of a communication channel. In a radio communication system, unlike other types of communication systems, a communication channel formed between the sending and the receiving stations and upon which information is communicated by the sending station to the receiving station, is formed of a portion of the electromagnetic spectrum. Radio links are defined upon the portion of the electromagnetic spectrum allocated to the radio communication system.

Because a radio link is utilized upon which to form communication channels, a fixed, or wireline, connection is not required to be formed between the sending and receiving stations to form a communication channel. Information can be communicated between the sending and receiving stations at, and between, locations at which conventional wireline communications would not be permitted. Additionally, the infrastructure costs associated with the installation of a radio communication system are also generally lower than the corresponding costs which would be required to install a conventional, wireline communication system. And, as the advancements in communication technologies have permitted the bandwidth allocated to a radio communication system to be utilized more efficiently, a radio communication can increasingly be utilized effectuate a communication service which require relatively significant data throughput capability.

A wireless broadband communication system has been proposed, for instance, by which to permit the effectuation of any of various communication services by way of radio links with fixed-site subscriber stations. Radio links are formed with the subscriber stations by fixed-site base stations. The base stations are installed at spaced-apart locations throughout the geographical area which is to be encompassed by the wireless broadband communication system.

Several subscriber stations are capable of communicating with a single base station.

Communication of data is effectuated between the subscriber stations and an associated base station by way of radio links upon which communication channels are defined. Because radio links are utilized between the subscriber stations and the base stations, the infrastructure costs associated with the formation of wireline connections between the subscriber stations are obviated. Broadband communications, and communication services which require the communication of broadband data, as well as communication services necessitating smaller data throughput rates are effectuable through use of the wireless broadband communication system.

Advancements in communication technologies have also permitted the development, and introduction, of other types of radio communication systems. Wireless communication systems, sometimes referred to as micro-cellular networks, private networks, and WLANs (wireless local area networks) are exemplary of such systems. Such networks, generally, provide for radio communications with mobile stations positioned within communication range of such networks.

Generally, the communication ranges of the mobile stations operable in such systems is relatively small as relatively low-power signals are originated at the mobile stations and, correspondingly, originated at the network infrastructure of such systems to be terminated at the mobile stations. The network infrastructure of such systems typically includes fixed-location transceivers, sometimes referred to as access points. The access points are capable of communicating with a group of mobile stations positioned within a micro-cellular, or other, area defined by the access point. In some of such systems, the access points are coupled to a conventional, local area network, also used to interconnect the processing stations of an office computer system. In other such systems, the access points are connected in other manners.

Installation of a wireless broadband communication system to provide broadband services with a plurality of subscriber stations provides a radio infrastructure throughout a geographical area throughout which wireless broadband communication services are effectuable. If a manner could be provided by which to utilize the communication capabilities of a wireless broadband communication system to provide additional communication services, additional benefits of a wireless broadband communication system would be provided.

It is in light of this background information related to radio communication systems that the significant improvements of the present disclosure have evolved.

SUMMARY

Aspects of the disclosure may be found in a wireless communication system that includes a wireless communication device in wireless communication with a base station and mobile stations. The wireless communication device includes first and second transceivers coupled to each other. The first transceiver is coupled to an antenna and is operable to communicate with the base station, which is also in wireless communication with other wireless communication devices. The second transceiver is coupled to another antenna and is in wireless communication with the plurality of mobile stations. The first transceiver receives a first signal from the base station intended for a one of the mobile stations, and in response the second transceiver transmits the first signal to the mobile station. The second transceiver receives a second signal from the mobile station intended for the base station, and in response the first transceiver transmits the second signal to the base station.

A more complete appreciation of the present disclosure and to the scope thereof can be obtained from the accompanying drawings which are briefly summarized below, the following detailed description of the presently-preferred embodiments of the disclosure, and the appended claims.

The foregoing has outlined rather broadly the features and technical advantages of the present disclosure so that those skilled in the art may better understand the detailed description of the disclosure that follows. Additional features and advantages of the disclosure will be described hereinafter that form the subject of the claims of the invention. Those skilled in the art should appreciate that they may readily use the conception and the specific embodiment disclosed as a basis for modifying or designing other structures for carrying out the same purposes of the present disclosure. Those skilled in the art should also realize that such equivalent constructions do not depart from the spirit and scope of the disclosure in its broadest form.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

DETAILED DESCRIPTION

Figure 1:
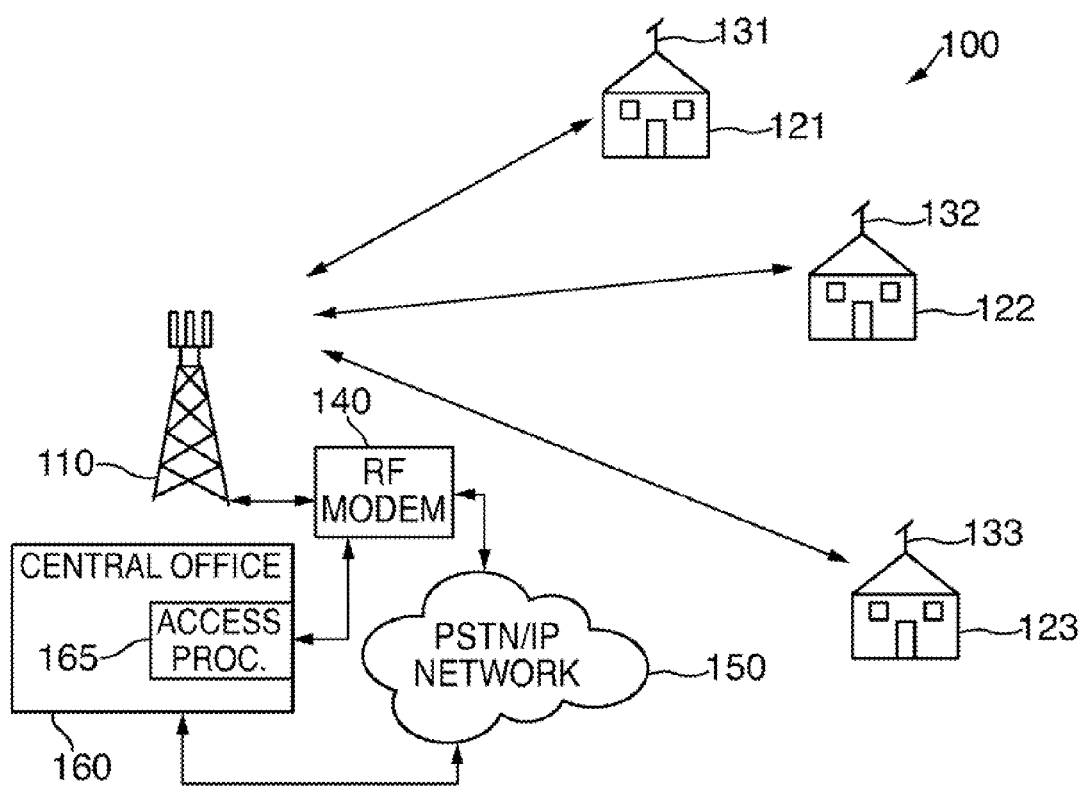
FIG. 1 illustrates exemplary fixed wireless access network according to one embodiment of the present disclosure.

FIG. 1 illustrates exemplary fixed wireless access network 100 according to one embodiment of the present disclosure. Fixed wireless network 100 comprises a plurality of transceiver base stations, including exemplary transceiver base station 110, that transmit forward channel (i.e., downstream) broadband signals to a plurality of subscriber premises, including exemplary subscriber premises 121, 122 and 123, and receive reverse channel (i.e., upstream) broadband signals from the plurality of subscriber premises. Subscriber premises 121-123 transmit and receive via fixed, externally-mounted antenna(r) 131-133, respectively. Subscriber premises 121-123 may comprise many different types of residential and commercial buildings, including single family homes, multi-tenant offices, small business enterprises (SBE), medium business enterprises (MBE), and so-called "SOHO" (small office/home office) premises.

The transceiver base stations, including transceiver base station 110, receive the forward channel signals from external network 150 and transmit the reverse channel signals to external network 150. External network 150 may be, for example, the public switched telephone network (PSTN) or one or more data networks, including the Internet or proprietary Internet protocol (IP) wide area networks (WANs) and local area networks (LANs). Exemplary transceiver base station 110 is coupled to RF modem 140, which, among other things, up-converts baseband data traffic received from external network 150 to RF signals transmitted in the forward channel to subscriber premises 121-123, RF modem 140 also down-converts RF signals received in the reverse channel from subscriber premises 121-123 to baseband data traffic that is transmitted to external network 150. In an exemplary embodiment of the present disclosure in which external network 150 is the public switched telephone network (PSTN), RF modem 140 transmits baseband data traffic to, and receives baseband data traffic from, access processor 165, which is disposed in central office facility 160 of the PSTN.

It should be noted that network 100 was chosen as a fixed wireless network only for the purposes of simplicity and clarity in explaining a subscriber integrated access device according to the principles of the present disclosure. The choice of a fixed wireless network should not be construed in any manner that limits the scope of the present disclosure in any way. As will be explained below in greater detail, in alternate embodiments of the present disclosure, a subscriber integrated access device according to the principles of the present disclosure may be implemented in other types of broadband access systems. In one embodiment of the present disclosure, such access systems may include wireline systems (i.e., digital subscriber line (DSL), cable modem, fiber optic, and the like) in which a wireline connected to the subscriber integrated access device carries forward and reverse channel signals.

Figure 2:
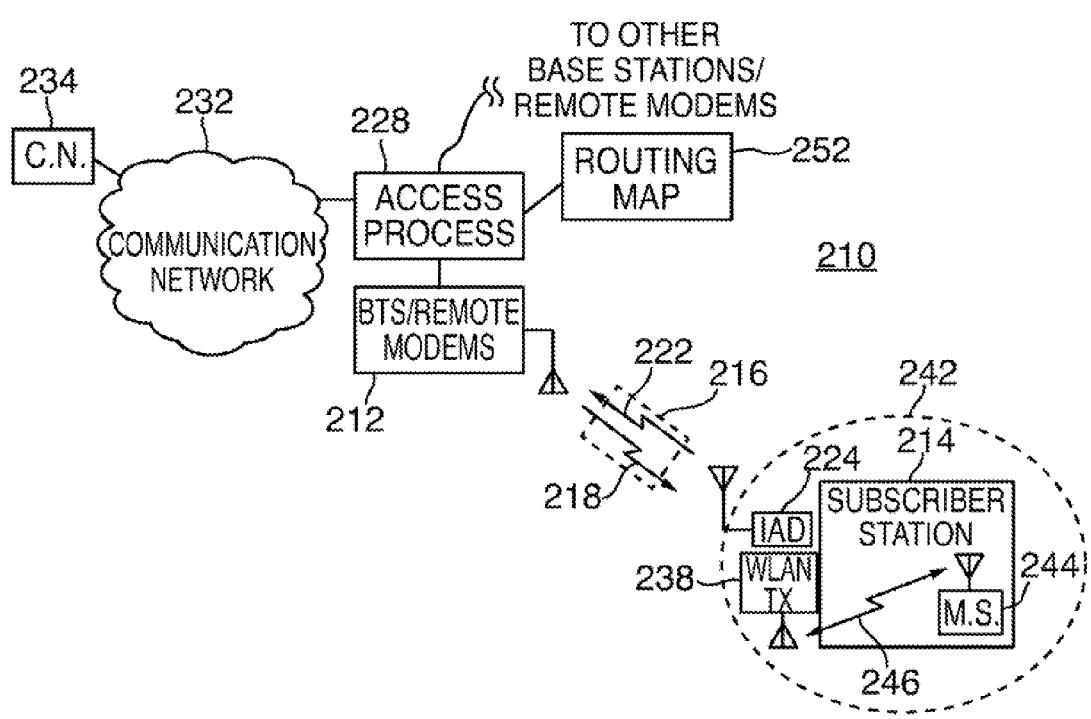
FIG. 2 illustrates a functional block diagram of a fixed wireless access (FWA) communication system in which an embodiment of the present disclosure is operable.

Referring to FIG. 2, a fixed wireless access (FWA) communication system 210 provides for radio communications between fixed-site base stations, of which the base station 212 is exemplary and fixed-site subscriber stations 214 of which the subscriber station 214 is exemplary. A radio link 216 upon which forward link channels 218 and reverse link channels 222 is of a bandwidth permitting broadband communication services to be effectuated with devices located at the subscriber station 214.

In the exemplary implementation, an integrated access device (IAD) 224 forms a transceiver located at the subscriber station and at which forward link signals transmitted upon the forward link channels of the radio link are detectable and which generate reverse link signals for transmission upon the reverse link channels of the radio link. A separate IAD 224 is located at each subscriber station of the communication system.

In the exemplary implementation, each base transceiver station includes a remote modem (modulator-demodulator) capable of communicating with seven separate subscriber stations located within a radial sector. In other implementations, the circuitry of the base transceiver station is configured in other manners.

The base station 212, and the set of remote modems thereof, is coupled to an access process 228 which is operable, amongst other things, to perform control operations to control operation of the communication system. The access process 228 is, in turn, coupled to a communication network 232 such as a public-switched telephonic network or a packet data network. And, a correspondent node 234 is coupled toe the communication network. A communication path is formable between the correspondent node and the IAD 224 positioned at the subscriber station by way of the communication network, the access process 228, the base station 212, and the radio link 216, Communication of information by the correspondent node to the integrated access device and from the integrated access device to the correspondent node is effectuable by way of the communication path.

Pursuant to an embodiment of the present disclosure, a WLAN (wireless local area network) transceiver 238 is positioned at the subscriber station 214 at the integrated access device 224 to be connected to the transceiver circuitry of the integrated access device. The WLAN transceiver defines a coverage area 242 defining a cell. A mobile station 244 positioned within the cell 242 is capable of communicating with the transceiver 238. That is to say, the radio link 246 is formable between the transceiver 238 and the mobile station 244 upon which forward and reverse link signals are communicated therebetween. Signals originated at the mobile station are communicated upon reverse link channels of the radio link 246 to the WLAN transceiver 238. And, communication signals to be terminated at the mobile station 244 are communicated upon forward link channels of the radio link 246.

Because of the connection of the WLAN transceiver to the transceiver of the integrated access device 224, signals originated at the mobile station and communicated to the WLAN transceiver can, in turn, be provided to the transceiver of the integrated access device to be communicated upon reverse link channels of the radio link 216 and, thereafter, be communicated to another device, such as the correspondent node 234. Analogously, signals originated at the correspondent node, or elsewhere, can be communicated to the mobile station by way of forward link channels of the radio links 216 and 246 to the mobile station. Thereby communications are effectuable with a mobile station in the fixed wireless access communication system.

In the exemplary implementation, the integrated access device 224 forms a rack-assembly having expansion slots to receive expansion cards thereat. And, the WLAN transceiver is mounted upon, or is otherwise formed at, an expansion card connectable to the expansion slot of the rack-assembly. Thereby the integrated access device together with the WLAN transceiver form an integrated device providing for two-way communication upon the radio link 216 as well as two-way communication upon the radio link 246.

Figure 3:
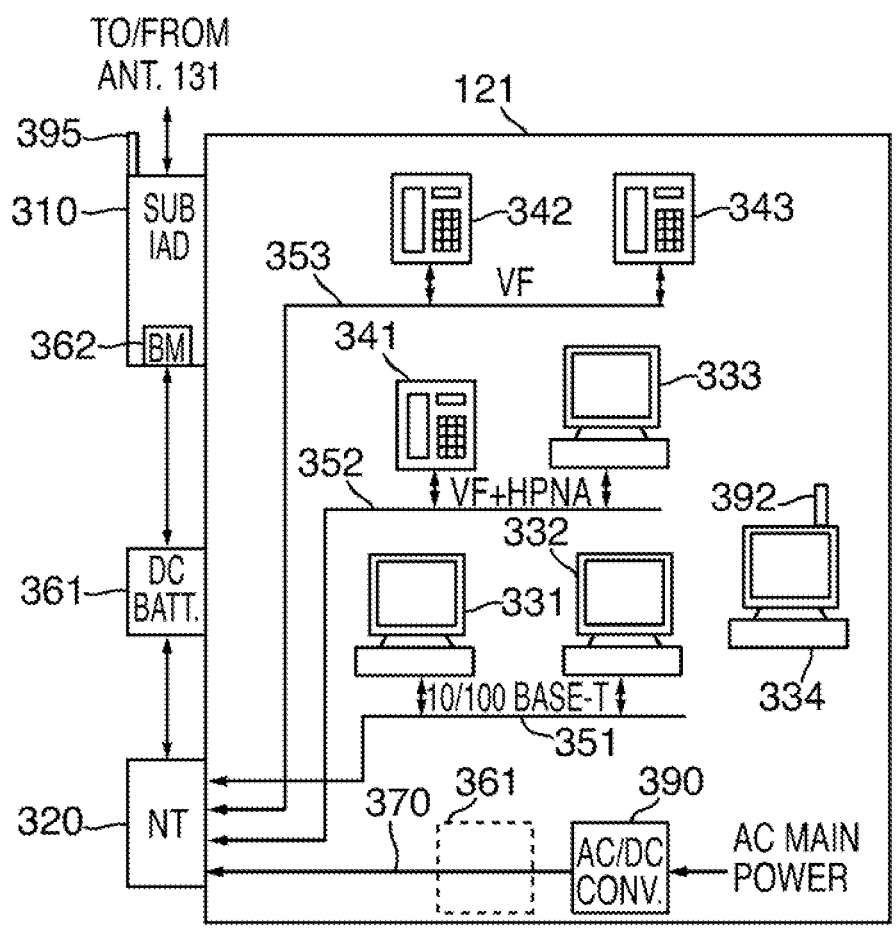
FIG. 3 illustrates exemplary subscriber premises in which subscriber integrated access device (IAD) according to the principles of the present disclosure is installed.

FIG. 3 illustrates exemplary subscriber premises 121 in which subscriber integrated access device (IAD) 310 according to the principles of the present disclosure is implemented. Subscriber IAD 310 is connected to one or more communication devices in subscriber premises 121 via network termination (NT) 320 or (optionally) via a wireless local area network (LAN) connection. Subscriber premises 121 may contain one or more processing devices, such as exemplary personal computers 331, 332, 333 and 334, and one or more telephones, including exemplary telephones 341, 342 and 343, that are capable of communicating via the broadband access capability of fixed wireless access network 100.

NT 320 is the external point to which data lines and phone lines within a residence or office are brought in order to be connected to the local telephone service provider. AC/DC converter 390 converts the main AC power in subscriber premises 121 to primary DC power that powers subscriber IAD 310. In order to comply with government regulations for telephone service to one or more telephones in subscriber premises 121, DC battery 361 is charged from the DC output of AC/DC converter 390 in order to provide at least eight hours of backup power in case of a failure of the AC main power in subscriber premises 121. Battery monitor (BM) 362 in subscriber IAD 310 detects main AC power failures and detects low power conditions on DC battery 361 and transmits alarms to fixed wireless access network 100 through subscriber IAD 310.

In an alternate embodiment of the present disclosure, DC battery 361 may be located inside subscriber premises 121 (as shown by dotted lines), rather than mounted on the outside of subscriber premises 121. However, in a preferred embodiment of the present disclosure, DC battery 361 is externally mounted in order to give maintenance personnel easy access to nearly all components of the subscriber access system (i.e., subscriber IAD 310, DC battery 361 antenna 131) without requiring the homeowner to be present. Although AC/DC converter 390 is disposed in subscriber premises 121, this does not present a problem. Conventional AC/DC converters have very large mean time between failure (MTBF) ratings, so that failures are rare. Furthermore, AC/DC converters are common, inexpensive commercial products that may be purchased and easily installed by the subscriber without the assistance of maintenance personnel. As will be described below in greater detail, since DC battery 361 is often mounted on the outside of subscriber premises 121, DC battery 361 may comprise an internal tamper alarm circuit that transmits an alarm to battery monitor 362 if DC battery 361 is opened or otherwise tampered with by someone other than maintenance personnel.

Figure 4:
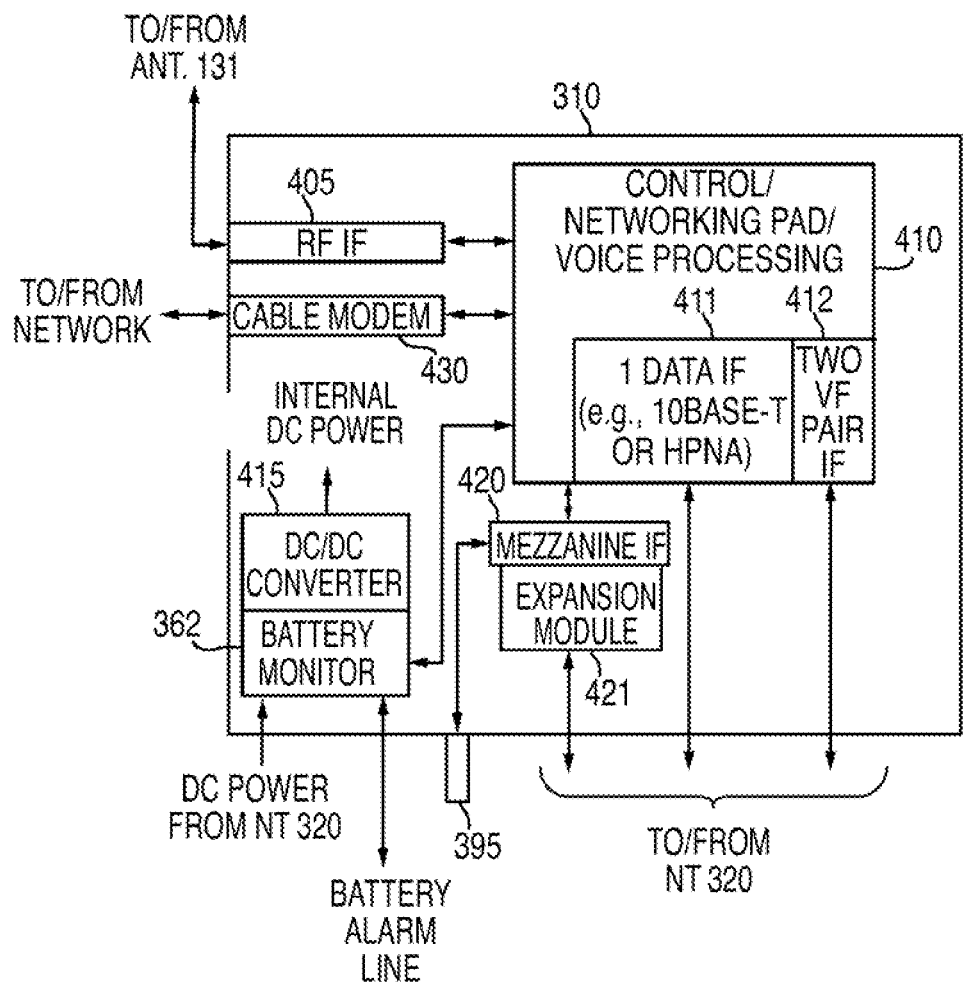
FIG. 4 depicts exemplary subscriber integrated access device (IAD) in greater detail according to one embodiment of the present disclosure.

FIG. 4 depicts exemplary subscriber integrated access device (IAD) 310 in greater detail according to one embodiment of the present disclosure. Subscriber IAD 310 is an external unit capable of, for example, radio frequency downconversion, protocol conversion, voice decompression and control functions. As noted above, the entire subscriber IAD system comprises three major elements:

1) external antenna 131 allows for multiple antenna options for increased gain or multiple element antenna subsystems;
2) subscriber IAD 310 main assembly contains the integrated printed circuit board (PCB) motherboard and a mezzanine interface into which an optional expansion module may be inserted to provide, for example, two additional voice frequency (VF) pairs, a T1/E1 module, or a TE/E3 module for use in a SOHO premises, a small/medium enterprise (SME) premises, or a multi-tenant unit (MTU) premises; and
3) DC battery 361 and AC/DC converter 390, which may be deployed inside or (preferably) outside subscriber premises 121 to provide at least eight (8) hours of operation without AC main power.

Subscriber IAD 310 is connected directly to some subscriber premises equipment (i.e., PC 331-333, telephones 341-343) to provide direct access to voice and broadband data in fixed wireless access network 100 at the NT 320 demarcation point at the customer premise. Both product cost and life-cycle/installation costs are reduced by integrating voice and data interfaces into a single external unit that connects to the standard NT 320 interface at the subscriber premises. Optionally, subscriber IAD 310 may also communicate wirelessly with some subscriber premises equipment, such as PC 334, via a wireless LAN connection. As will be explained below, subscriber IAD 310 may wirelessly transmit data to and receive data from PC 334 via antenna 395. Similarly, PC 334 may wirelessly transmit data to and receive data from subscriber IAD 310 via antenna 392.

In an advantageous embodiment of the present disclosure, subscriber IAD 310 may provide at least four data interface options, including:
1) separate Cat-5 twisted pairs for 10Base-T Ethernet;
2) one of the VF pairs may be used with, for example, a 1 Mbps or 10 Mbps Home Phone Network Alliance (HPNA) interface or other shared voice/data home wiring twisted pair system;
3) home power line interface with release of higher bandwidth implementations (>1 Mbps); and
4) wireless LAN connection to subscriber premises equipment.

In an advantageous embodiment, subscriber IAD 310 comprises RF interface (IF) 405, control/networking PAD/voice processing circuitry 410, DC/DC converter 415, battery monitor 362, and mezzanine interface 420. In a fixed wireless embodiment, RF IF 405 provides modulation and demodulation of forward and reverse channel signals between transceiver base station 110 and subscriber IAD 310. DC/DC converter 415 converts the external DC power received from battery 361 to the necessary internal DC power levels used by the components of subscriber IAD 310. Battery monitor 362 monitors the battery power from DC battery 361 and receives alarm signals, if any, from DC battery 361.

If main AC power fails, or if DC battery 361 is tampered with, DC battery 361 transmits alarm signals to battery monitor 362. If the DC power level from DC battery falls too low after an AC power failure, battery monitor 362 detects the low DC power level condition and generates an alarm. The alarms generated by or received by battery monitor 362 are sent to control/networking PAD/voice processing circuitry 410 in order to be transmitted back to the fixed wireless service provider.

In a standard (and low cost) configuration, control/networking PAD/voice processing circuitry 410 comprises, among other things, two voice frequency (VF) pair interface (IF) 412 and data interface (IF) 325. Control/networking PAD/voice processing circuitry 410 performs the overall control functions of subscriber IAD 310 and converts reverse channel voice and data signals received from telephones 341-343 and PC 331-333 to the necessary protocols for transmission to transceiver base station 110 via RF IF 405. Similarly, control/networking PAD/voice processing circuitry 410 converts forward channel signals received from transceiver base station 110 via RF IF 405 to voice and data signals that are used by telephones 341-343 and PC 331-333.

In alternate wireline embodiments of the present disclosure, subscriber IAD 310 may also comprise an expansion slot for one or more wireline interfaces, including for example, cable modem 430. Alternative wireline interfaces may include an optical interface, a DSL router, or the like, in addition to, or in place of, RF IF 405, Cable modem 430 (or an optical interface or a DSL router) provide external interface connection points for a cable modem data line, a fiber optic line, and a DSL line, respectively.

As noted above, in an advantageous embodiment of the present disclosure, mezzanine IF 420 receives expansion module 421 in order to provide additional capabilities to subscriber IAD 310, particularly to meet the needs of small-medium business enterprises and multi-tenant units. For example, expansion module 421 may comprise a voice frequency pair interface, similar to two VP IF 412, providing subscriber IAD 310 with a total capability or four voice lines and one data line (4V/1D).

In a second embodiment, expansion module 421 may comprise a T1/E1 interface. In a third embodiment, expansion module 421 may comprise a T3/E3 interface. In a fourth embodiment, expansion module 421 may comprise a DSL or cable modem interface.

Finally, in a wireless LAN embodiment, expansion module 421 may comprise a wireless transceiver interface that communicates with PC 334 via antenna 395. In the illustrated embodiment, antenna 395 is an integral component of subscriber IAD 310 that is coupled to a connection pin on mezzanine IF 420. In such an embodiment, expansion module 421 comprises conventional RF transceiver circuitry, but does not require its own antenna. However, in an alternate embodiment, antenna 395 may be an integral component of expansion module 421, such that subscriber IAD 310 does not contain a separate antenna for wireless LAN purposes.

Figure 5:
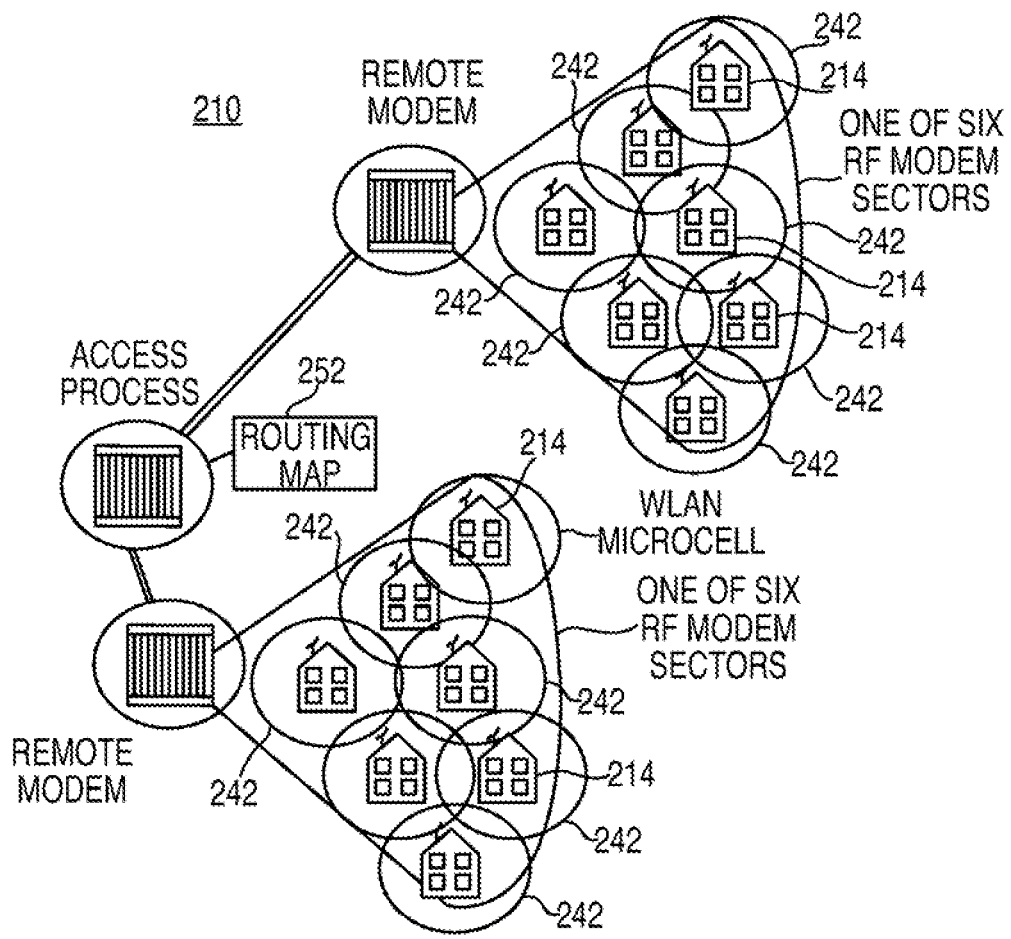
FIG. 5 illustrates a representation of a fixed wireless access communication system similar to that shown in FIG. 2 here also illustrating a plurality of cellular coverage areas defined by about a plurality of subscriber stations of the fixed wireless access communication system.

FIG. 5 illustrates another view of the communication system 210, here illustrating an implementation in which a plurality of subscriber stations 214 include WLAN transceivers 238 (shown in FIG. 2) connected to corresponding integrated access devices 224 (also shown in FIG. 2). The coverage areas 242 defined by respective ones of the WLAN transceivers are shown in the figure. Adjacent ones of the coverage areas overlap with one another. The remote modems of the base transceivers are again shown in the Figure as is the access process. An arrangement in which the remote modems communicate with subscriber stations positioned within a radio sector is shown in the figure. In other implementations, other arrangements are utilized.

A mobile station initially positioned within, or approximate to, a coverage area 242 defined by a WLAN transceiver positioned at a first subscriber station is permitted movement, such as out of the coverage area defined by the transceiver positioned at a first subscriber station and into the coverage area defined by a WLAN transceiver of another subscriber station. Through operation of an embodiment of the present disclosure, a handover of communications is effectuated from the first WLAN transceiver to another WLAN transceiver, thereby to permit continued communications with the mobile station.

Determination of when to initiate handover of communications is made responsive to measurements of signal characteristics of communication signals communicated between the WLAN transceiver and the mobile station. In one implementation signal characteristics are measured, or otherwise determined, at the mobile station and results of such measures or determinations of are reported back to the WLAN transceiver, and appropriate control circuitry. Thereafter, if appropriate, the handover of communications is effectuated.

A routing map 252 is further shown in the figure. The routing map is functionally connected to the access process 228. The routing map includes a listing of the mobile stations, such as the mobile station 246 operable to transceive communication signals pursuant to the WLAN service. Indexed together with the listing of the mobile stations are the locations at which the mobile stations are positioned. When communications are to be effectuated with a particular mobile station, such as communications originated by the correspondent node 234, the routing map is accessed and the communication signals are routed to the mobile stations at the position indicated in the routing map. And, when a handover is effectuated, information routed to a mobile station but not yet delivered is rerouted to the WLAN transceiver to which communications have been handed over.

Figure 6:
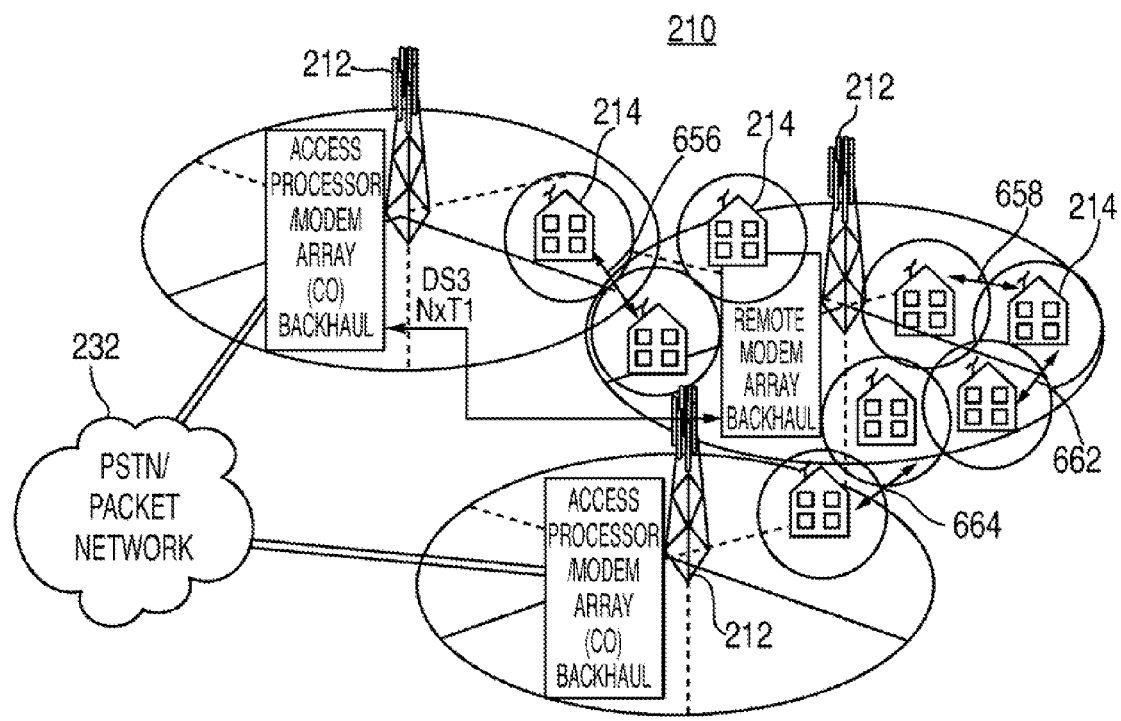
FIG. 6 illustrates another representation of the fixed wireless access communication system shown in FIGS. 1 and 2.

FIG. 6 again illustrates the communication system 210, here showing a plurality of base stations 212 and subscriber stations 214 associated with various ones of the base stations. Each of the subscriber stations includes a WLAN transceiver (shown in FIG. 2) various of the base transceiver stations are here shown also to be coupled by way of the communication network 232, again either a PSTN, a packet data network, or a combination of such networks. Movement of a mobile station between the coverage areas is defined by different ones of the subscriber stations are shown in the figure. For instance, movement of a mobile station indicated by the arrow 656 represents movement of the mobile station between subscriber stations associated with separate cells of separate base stations. Such movement results in access process routing of subsequent communication signals to a new cell of the fixed wireless access communication system, access process routing to a separate remote mode sector, and remote modem routing to a new subscriber integrated access device. The arrow 658 is representative of movement of a mobile station within a single sector of a single base station. Here, the result is a subscriber integrated access device to a remote modem routing change.

The arrow 662 is representative of movement of a mobile station between adjacent sectors defined by a single base station. Such movement results in access process routing of the communication signal to the new remote modem sector transceiver. And, the arrow 664 is representative of movement of a mobile station between sectors of different cells defined by two different base stations. Such movement results in access process to access process routing resolution, access processing routing to the new cell, access process routing to the new remote modem sector, and remote modem routing to the new subscriber access integrated device. Thereby, handovers of communications are effectuable through any movement of a mobile station between coverage areas defined by WLAN transceivers forming a portion of a fixed wireless access communication system.

Figure 7:
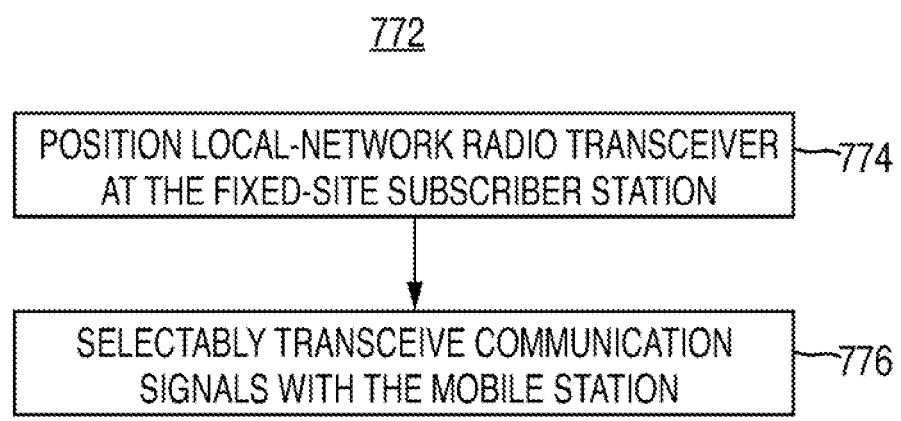
FIG. 7 illustrates a method flow diagram listing the method of operation of the method of an embodiment of the present disclosure.

FIG. 7 illustrates a method, shown generally at 772 of an embodiment of the present disclosure. The method facilitates radio communications with the mobile station in a fixed wireless access communication system having at least a first base station and at least a first subscriber station capable of communicating with the base station. First, and as indicated by the block 774, a local-network radio transceiver is positioned at the fixed-site subscriber station. Then, and as indicated by the block 776, communication signals are selectably transceived with the mobile station upon a first local radio link between the local-network radio transceiver and a mobile station when the mobile station is positioned within a coverage area defined by the local-network radio transceiver.

Through operation of the method of an embodiment of the present disclosure, WLAN service is provided in a fixed wireless access in a communication system. A mobile station operable in a wireless local area network is thereby able to communicate in the WLAN coverage area encompassing the subscriber station at which the local-network radio transceiver is positioned.

The previous descriptions are of preferred examples for implementing the disclosure, and the scope of the disclosure should not necessarily be limited by this description. The scope of the present invention is defined by the following claims.

What is claimed is:

1. A wireless communication device, comprising:
   a first transceiver in wireless communication with a terrestrial base station, wherein the terrestrial base station is in wireless communication with a plurality of wireless communication devices; and
   a second wireless local area network transceiver in wireless communication with a plurality of computing devices located within a coverage area of the second wireless local area network transceiver, the second wireless local area network transceiver being coupled to the first transceiver wherein:
      the first transceiver receives a first signal from the base station, the first signal intended for a first computing device of the plurality of computing devices, the second wireless local area network transceiver determines signal characteristics of the first computing device, and the second wireless local area network transceiver transmits the first signal to the first computing device based on the determined signal characteristics of the first computing device; and
      the second wireless local area network transceiver receives a second signal from the first computing device, the second signal intended for the base station, and the first transceiver transmits the second signal to the base station.

2. The wireless communication device of claim 1, wherein the second wireless local area network transceiver is removably coupled to the first transceiver.

3. The wireless communication device of claim 2, further comprising an antenna, wherein the second wireless local area network transceiver is removably coupled to the antenna.

4. The wireless communication device of claim 1, wherein the wireless communication device is a fixed-site subscriber station.

5. The wireless communication device of claim 1, wherein the wireless communication device is mounted on the outside of a building and at least some of the plurality of computing devices are located inside the building.

6. The wireless communication device of claim 1, further comprising an AC power supply and a battery power supply.

7. The wireless communication device of claim 6, further comprising a battery monitor operable to detect error conditions in one of the AC power supply and the battery power supply and transmit an alarm signal to the base station via the first transceiver.

8. The wireless communication device of claim 1, wherein the first transceiver is further operable to communicate via wireline with one of a telephone and a personal computer.

9. A wireless communication system, comprising:
   a first wireless communication device in wireless communication with a base station and a plurality of computing devices, the first wireless communication device comprising:
      a first transceiver coupled to a first antenna, the first transceiver operable to communicate with a terrestrial base station in wireless communication with a plurality of wireless communication devices, wherein the first wireless communication device is one of the plurality of wireless communication devices; and
      a second transceiver coupled to a second antenna, the second transceiver in wireless communication with the plurality of computing devices, the second transceiver being coupled to the first transceiver wherein:
         the first transceiver receives a first signal from the base station, the first signal intended for a first computing device of the plurality of computing devices, the second transceiver determines signal characteristics of the first computing device, and the second transceiver transmits the first signal to the first computing device based on the determined signal characteristics of the first computing device; and
         the second transceiver receives a second signal from the first computing device, the second signal intended for the base station, and in response the first transceiver transmits the second signal to the base station.

10. The wireless communication system of claim 9, wherein the second transceiver is removably coupled to the first transceiver.

11. The wireless communication system of claim 9, wherein the second transceiver is removably coupled to the second antenna.

12. The wireless communication system of claim 9, wherein the wireless communication device is a fixed-site subscriber station.

13. The wireless communication system of claim 9, wherein the first wireless communication device is adapted for mounting to an outside surface of a building.

14. The wireless communication system of claim 9, wherein the wireless communication device further comprises an AC power supply and a battery power supply.

15. The wireless communication system of claim 14, wherein the wireless communication device further comprises a battery monitor operable to detect error conditions in one of the AC power supply and the battery power supply and transmit an alarm signal to the base station via the first transceiver.

16. The wireless communication system of claim 9, wherein the first transceiver is further operable to communicate via wireline with one of a telephone and a personal computer.

* * * * *